(12) United States Patent
Wacha et al.

(10) Patent No.: US 9,122,668 B1
(45) Date of Patent: Sep. 1, 2015

(54) METHODS AND A COMPUTING DEVICE FOR CONFIGURING A WATERFALL CHART

(71) Applicant: WORKIVA LLC, Ames, IA (US)

(72) Inventors: Thomas Joseph Wacha, Ames, IA (US); Dustin John Holmes, Ankeny, IA (US); Kyle James McMorrow, Ames, IA (US); Edward Yee Ly, Jewell, IA (US); Timothy Lee Gilbert, Bondurant, IA (US); Sidney Robert Pitt, Ames, IA (US); Tucker Douglas Hays, Ames, IA (US); Kent Wesley Iverson, Ames, IA (US); Rick Warren Maples, Ankeny, IA (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 14/509,830

(22) Filed: Oct. 8, 2014

(51) Int. Cl.
| | |
|---|---|
| *G06F 17/00* | (2006.01) |
| *G06F 17/24* | (2006.01) |
| *G06F 17/21* | (2006.01) |
| *G06F 3/0484* | (2013.01) |

(52) U.S. Cl.
CPC .......... *G06F 17/246* (2013.01); *G06F 3/04842* (2013.01); *G06F 17/211* (2013.01); *G06F 17/245* (2013.01)

(58) Field of Classification Search
CPC .... G06F 17/246; G06F 17/245; G06F 17/211
USPC .......................... 715/212, 215, 217, 219, 220
See application file for complete search history.

(56) References Cited

U.S. PATENT DOCUMENTS

| | | | |
|---|---|---|---|
| 7,667,582 B1 | 2/2010 | Waldorf | |
| 8,433,636 B2 | 4/2013 | Ng | |
| 8,520,000 B2* | 8/2013 | Duncker et al. | 345/440 |
| 8,661,358 B2 | 2/2014 | Duncker et al. | |
| 2003/0126053 A1 | 7/2003 | Boswell et al. | |
| 2008/0255973 A1 | 10/2008 | El Wade et al. | |
| 2012/0246310 A1 | 9/2012 | Broda et al. | |
| 2013/0007645 A1* | 1/2013 | Kurniawan et al. | 715/769 |
| 2014/0085308 A1 | 3/2014 | Huang et al. | |

OTHER PUBLICATIONS

Bespalaya, Ekaterina; How to create waterfall chart in Excel (bridge chart), published Jul. 15, 2014, pp. 1-8 https://www.ablebits.com/office-addins-blog/2014/07/25/waterfall-chart-in-excel/.*
Microsoft, "Microsoft Excel 2010", Microsoft, copyrighted 2010, SS1A-SS13, 64 pages.*

(Continued)

*Primary Examiner* — Cesar Paula
*Assistant Examiner* — David Faber
(74) *Attorney, Agent, or Firm* — Drinker Biddle & Reath LLP

(57) ABSTRACT

A computing device (e.g., a processor executing instructions on the computing device) receives an input (e.g., from a user or from a data stream) into a cell of a table (e.g., a cell of a spreadsheet, worksheet, or workbook). If the input is a sum (e.g., a formula whose result is the sum of previous cells), then the computing device renders a total column representing the sum on a waterfall chart (e.g., on a user interface rendered on an electronic display). Otherwise, if the input is a static value (e.g., an integer or decimal number), then the computing device renders a change column representing the static value.

4 Claims, 15 Drawing Sheets

(56) References Cited

OTHER PUBLICATIONS

Moxie, Doctor; "Excel Waterfall Charts with Ease", NHS Excel, Jan. 14, 2014, 8 pages http://nhsexcel.com/excel-waterfall-bridge-charts/.*

Perin, Lucas Meyer, "Excel 2010 Bridge (or Waterfall) Template and Example", Finance Ph. D., Aug. 8, 2011, 3 pages http://financephd.typepad.com/blog/2011/08/building-a-bridge-or-waterfall-chart-with-excel.html.*

Peltier, John, "Excel Waterfall Charts (Bridge Charts)", Peltier Tech Blog, Jul. 7, 2011, 14 pages http://peltiertech.com/excel-waterfall-charts-bridge-charts/.*

Add-ins.com, "Waterfall Chart Creator", 2013, Add-Ins.com LLC, 37 screenshots (SS0-36) + 21 pages Help and Excerise File (59 pages total). Program available at https://www.add-ins.com/waterfall_charts.htm.*

Excel Help HQ, "Waterfall chart template download with instructions (supports negative values)," http://excelhelphg.com/waterfall-chart-tem plate-download-with-instructions-su pports-negative-values, 2013, pp. 1-5.*

Kalita, "Waterfall Chart," http://www.mathworks.com/matlabcentral/fileexchange/22703-waterfall-chart/content/waterfallchart.m, Jan. 16, 2009, pp. 1-2.*

Excel Help HQ, "Waterfall chart template download with instructions (supports negative values)," http://excelhelphg.com/waterfall-chart-template-download-with-instructions-supports-negative-values, 2013, pp. 1-5.

EXCELX2.Com, "Excel Waterfall/Cascade Charts," http://excelx2.com/, 2006, pp. 1-2.

"Create a Waterfall chart online and receive the Excel file by email," http://www.waterfall-chart.com, p. 1, Jun. 11, 2014.

Jearakul, "2D Chart and 3D Waterfall Chart Control," http://www.developer.com/net/cplus/article.php/629531/D2-Chart-and-3D-Waterfall-Chart-Control.htm, Jul. 24, 2000, pp. 1-3.

SAS Institute Inc., "Graphics Waterfall Chart," http://support.sas.com/rnd/datavisualization/yourGraphs/businessQuick/waterfall, 2014, p. 1.

Think-Cell Sales GmbH & Co., "8 Waterfall chart," http://www.think-cell.com/en/support/documentation/waterfall.shtml, 2014, pp. 1-5.

* cited by examiner

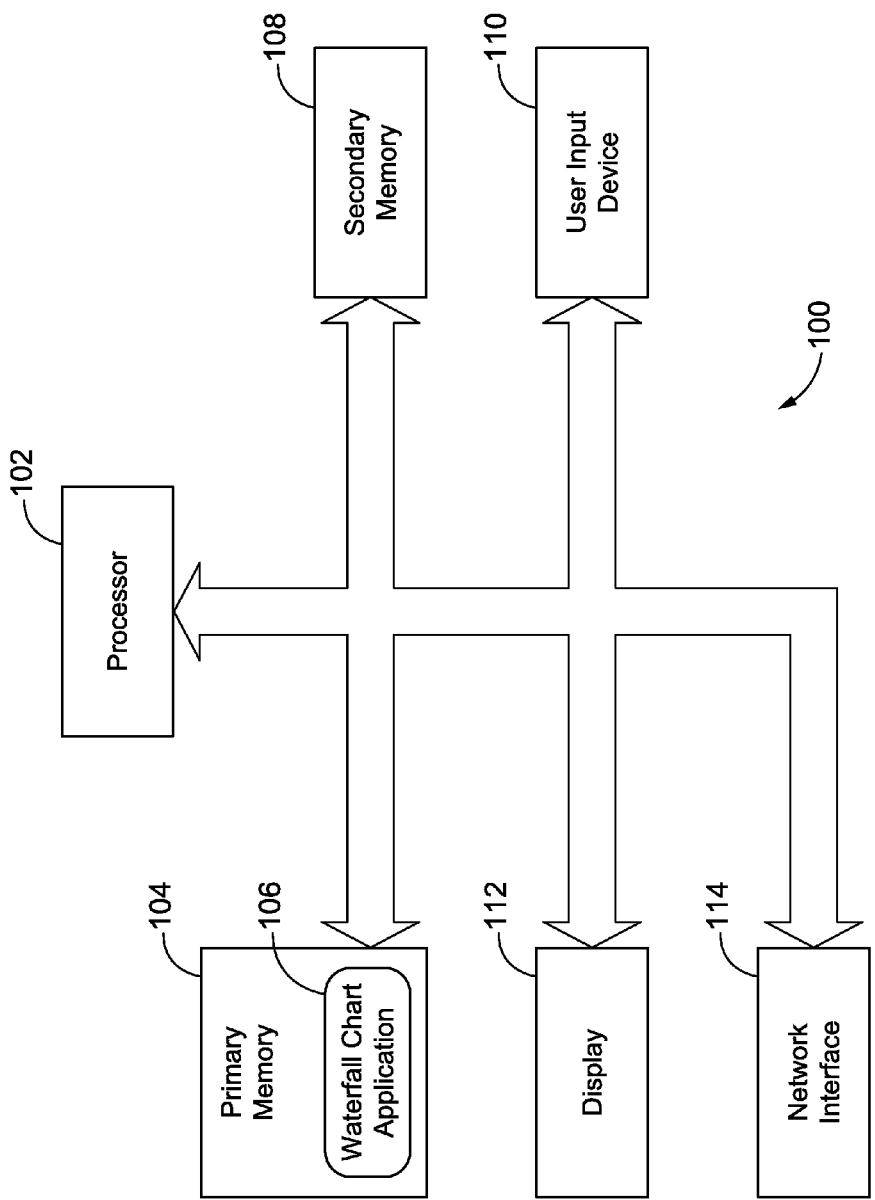

METHODS AND A COMPUTING DEVICE FOR CONFIGURING A WATERFALL CHART

TECHNICAL FIELD

The present disclosure is related generally to graphics presentation techniques and, more particularly, to methods and a computing device for configuring a waterfall chart.

BACKGROUND

Waterfall charts are often used by business professionals to show the cumulative effects of changes to an initial value. Typically, a waterfall chart is made up of multiple columns appears somewhat like a bar graph. Generally, the first column is an initial value, the last column is a cumulative total, and the intermediate columns are change columns. Each change column can be either positive or negative and is dimensioned such that one edge is at the same vertical height as the current cumulative "total" and another, opposite edge is above (for positive change columns) or below (for negative change columns) the first edge by a vertical dimension that is proportional to the degree of change that has occurred. The visual effect of change columns is that they appear to "float" relative to the first column and final column. Change columns are generally color coded to indicate whether the change is positive or negative.

Typically, to create a waterfall chart, professionals start with a regular spreadsheet program and use a series of complicated formulas. Furthermore, such professionals often find themselves creating the floating change columns by stacking visible columns on top of invisible columns.

DRAWINGS

While the appended claims set forth the features of the present techniques with particularity, these techniques, together with their objects and advantages, may be best understood from the following detailed description taken in conjunction with the accompanying drawings of which:

FIG. 1 shows a possible implementation of a computing device;

DESCRIPTION

Figure 2A:
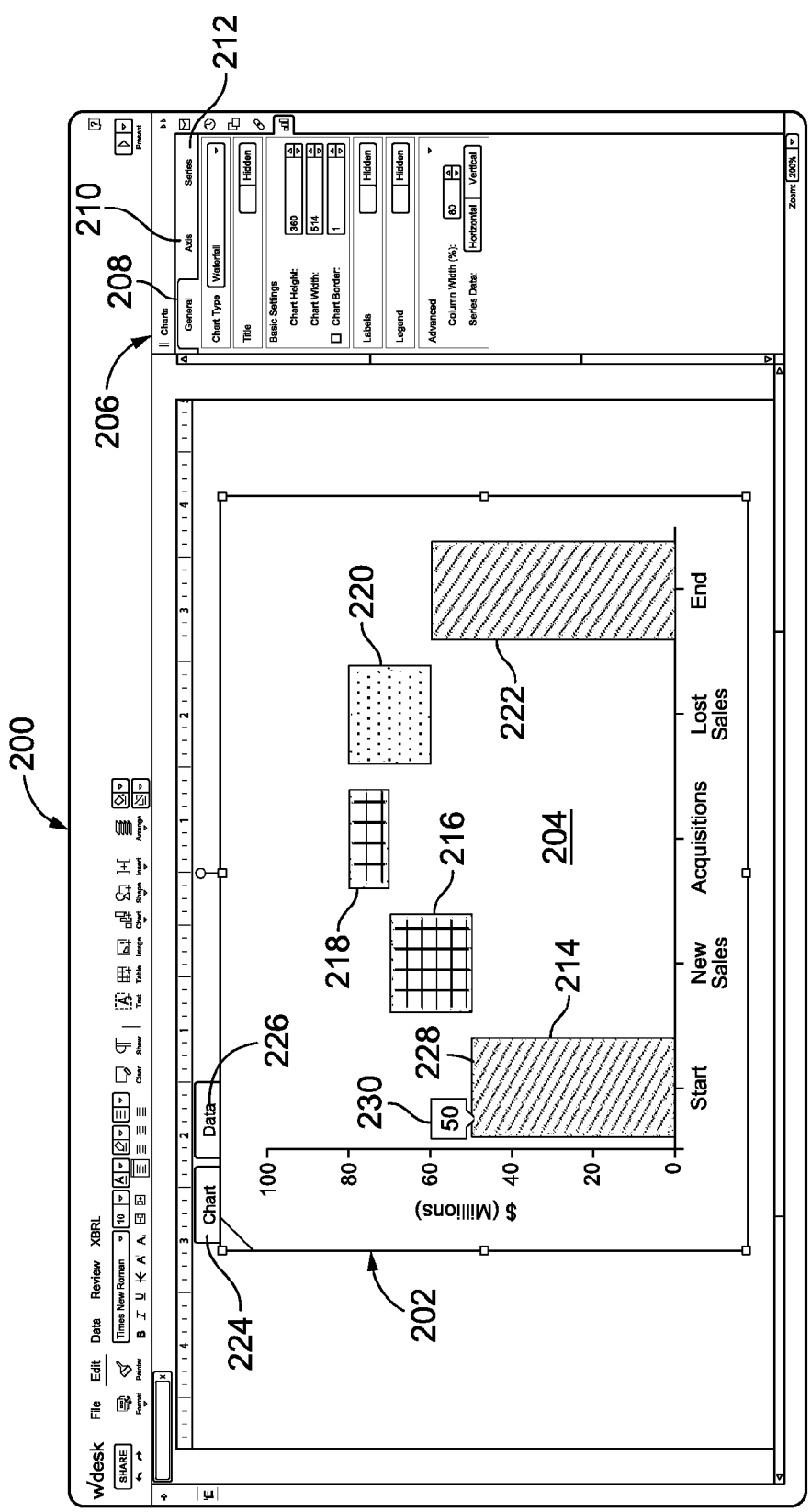
FIGS. 2A-2E show features of a user interface according to various embodiments.

This disclosure is generally directed to methods and a computing device for configuring a waterfall chart. In various embodiments, the computing device (e.g., a processor executing instructions on the computing device) receives an input (e.g., from a user or from a data stream) into a cell of a table (e.g., a cell of a spreadsheet, worksheet, or workbook). If the input is a sum (e.g., a formula whose result is the sum of previous cells), then the computing device renders a total column representing the sum on a waterfall chart (e.g., on a user interface rendered on an electronic display). Otherwise, if the input is a static value (e.g., an integer or decimal number), then the computing device renders a change column representing the static value. In some embodiments, the computing device renders the column based on its position in the waterfall chart. For example, the computing device may, by default, render the first column as a total column and render the last as a total column regardless of whether inputs into the cells corresponding to the first column and the last column are static values or sums. The computing device can override this default behavior in response to an appropriate user manipulation of an on-screen control.

In some embodiments, the computing device presents, on a user interface, multiple color options for positive change columns and multiple color options for negative change columns. The computing device receives, via the user interface, a selection of a color option for one or both of the positive change columns and the negative change columns. In response to the selection, the computing device changes the color of all of the positive change columns or all of the negative change columns (or both) to the selected color option (or options). Additionally, the computing device may offer the same color options for total columns.

According to various embodiments, the computing device receives a selection of a column of the waterfall chart and receives an input, via an on-screen control, indicating that the column should be converted from a total column to a change column or from a change column to a total column. In response to the input, the computing device converts the column from a total column to a change column or from a change column to a total column (as indicated by the input).

Various parts of this disclosure refer to a "user" taking an action with respect to the computing device, and the computing device responding in different ways. It should be noted, however, that the various methods described herein need not involve a user. For example, the computing device described herein may receive input from another computing device through an application programming interface and react in the same manner as it would have reacted had the input been received from the user via a user interface.

Turning to FIG. 1, in an embodiment, the various methods described herein are carried out on a computing device, generally labeled 100. The computing device 100 ("device 100") may be implemented as any type of computing device, including a desktop computer, a notebook computer, and a smartphone. In one implementation, the device 100 includes processor 102, a primary memory 104 (e.g., volatile memory, random-access memory) that contains a waterfall chart application 106 ("application 106"), a secondary memory 108 (e.g., non-volatile memory), a user input device 110 (e.g., a keyboard, mouse, or touchscreen), a display 112 (e.g., an organic, light-emitting diode display), and a network interface 114 (which may be wired or wireless). The memories 104 and 108 store instructions and data. The processor 102 executes the instructions, such as those of the application 106, and uses the data to carry out various procedures including, in some embodiments, the methods described herein. The device 100 in general and the processor 102 in particular are able to communicate with other computing devices via the network interface 114 over a network (e.g., the Internet).

To create and configure a waterfall chart in an embodiment, a user interacts with the device 100 to execute the application 106. The application 106 presents a user interface to the user on the display 112. The contents of the user interface may be locally generated by the application 106. Additionally or alternatively, the device 100 may receive the contents of the user interface and from a remotely-located computing device (e.g., a server).

When the device 100 executes the application 106, the device 100 displays a user interface ("UI") on the display 112. An embodiment of such a UI is shown in FIG. 2A. The UI 200 includes a display area 202, in which the device 100 displays a waterfall chart 204, and a chart control area 206. The chart control area 206 has various controls for configuring the waterfall chart 204, including a first tab 208, a second tab 210, and a third tab 212. The waterfall chart 204 in this example has multiple columns, including a first total column 214, a first change column 216, a second change column 218, a third change column 220, and a second total column 222. The first change column 216 and the second change column 218 are each positive change columns and are of a first color to indicate this fact. The third change column 220 is of a second color to indicate that it is a negative change column. The first and second total columns 214 and 222 are of a third color to indicate that they are total columns. The waterfall chart 204 is merely one example of what the device 100 is capable of displaying. The waterfall chart 204 may, in fact, have any number of change columns (positive and negative) and total columns, but will generally have a start total column (the first column on the left) and an end total column (the last column on the right).

Just above the display area 202 is a chart tab 224 and a data tab 226. When the chart tab 224 gets activated (e.g., clicked on by a user), the device 100 displays the waterfall chart 204 in the display area 202. When the data tab 226 gets activated, the device 100 displays a table that contains the data used by the device to render the waterfall chart. For example, assuming that the waterfall chart 204 of FIG. 2A is being displayed, when a user activates the data tab 226, the device 100 displays the table 300 shown in FIG. 3. When a user hovers a pointer 228 over one of the columns of the waterfall chart 204, the device 100 displays the value represented by the column in a balloon 230.

Figure 2B:
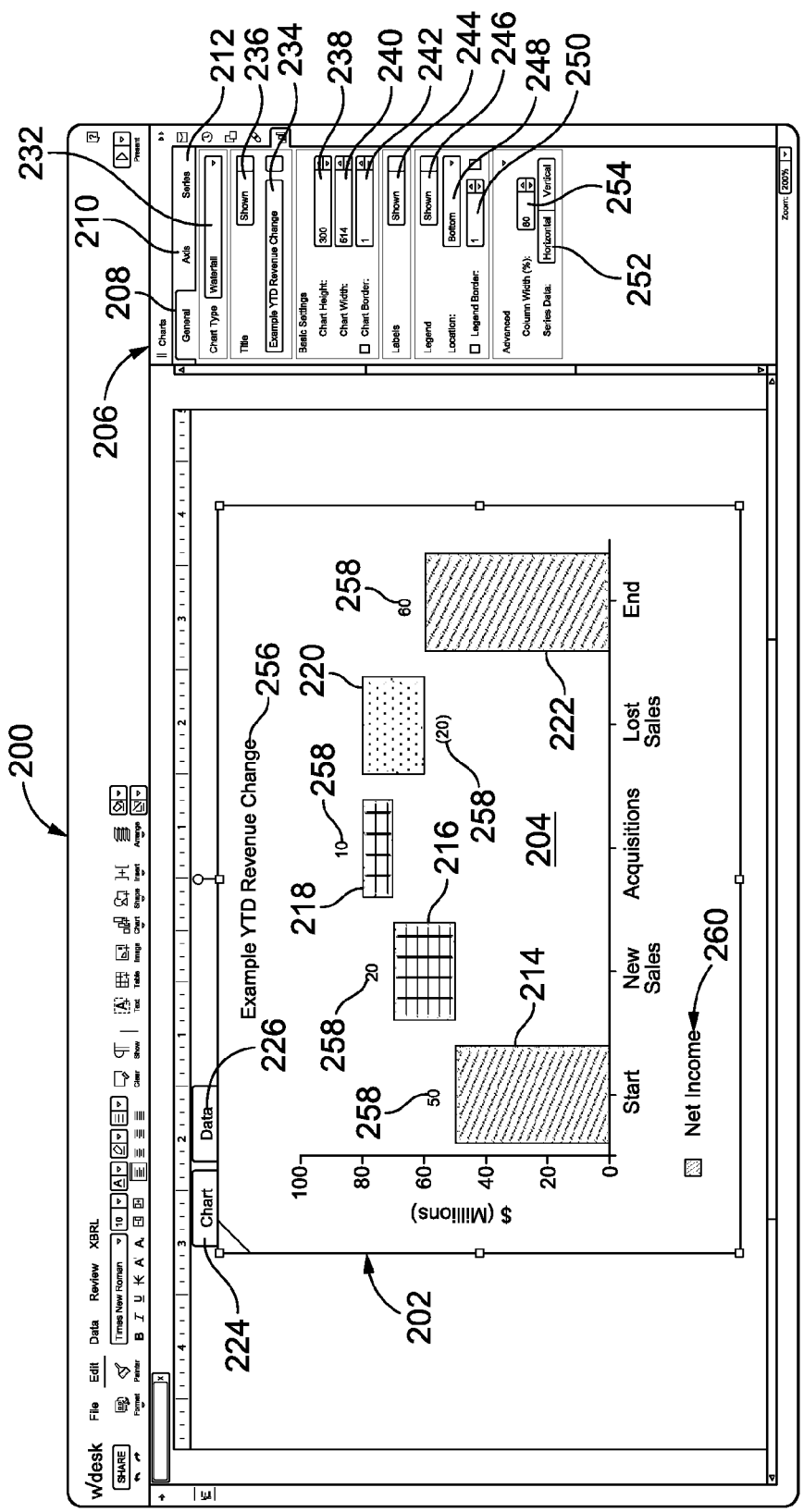

Turning to FIG. 2B, the first tab 208 includes a chart type pull down menu 232, a title entry field 234, a title show/hide control 236, a chart height entry field 238, a chart width entry field 240, a chart border thickness field 242, a label show/hide control 244, a legend show/hide control 246, a legend location pull-down menu 248, a legend border thickness entry field 250, a column width percentage field 252, and a series data horizontal/vertical control 254.

Figure 2C:
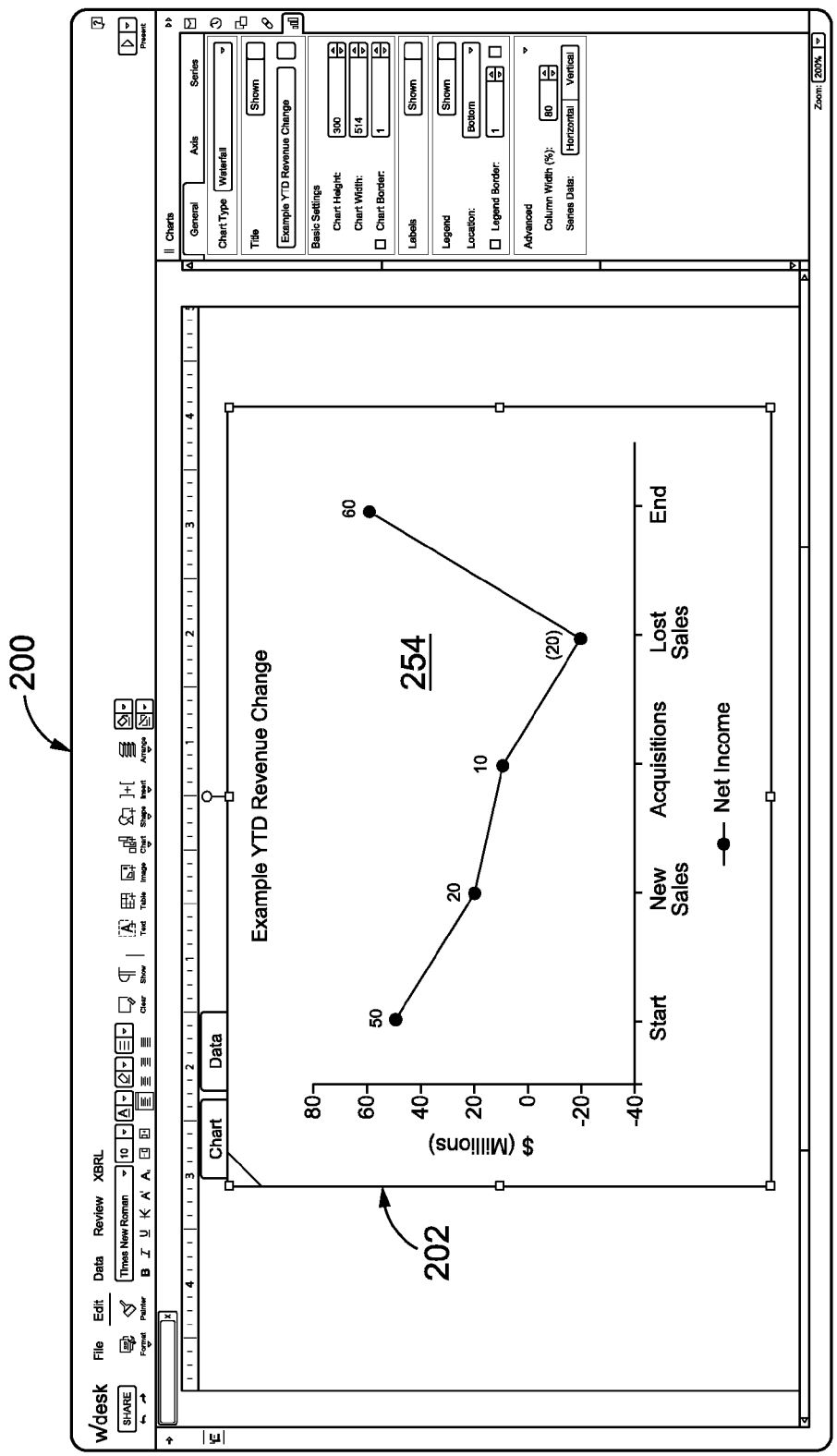

According to an embodiment, a user can change the type of the chart by selecting the desired type (e.g., graph, line, waterfall, etc.) from the chart type pull down menu 232. If, for example, the user selects a line graph, then the device 100 replaces the waterfall chart 204 with a line graph 254, as shown in FIG. 2C. The user can also enter a title for the waterfall chart 204 in the title entry field 234. If the title show/hide control 236 is set to "Shown" as depicted in FIG. 2B, then the device 100 displays the title text 256 at the top of the waterfall chart 204.

According to various embodiments, the device 100 sets the height of the waterfall chart 204 in accordance with the value entered in the chart height entry field 238, sets the width of the waterfall chart 204 in accordance with the value entered in the chart width entry field 240, and sets the thickness of the border of the waterfall chart 204 in accordance with the value entered in the border thickness field 242. If the label show/hide control 244 is set to "Shown" as depicted in FIG. 2B, then the device 100 displays a label 258 just above each column to indicate the underlying value represented by the column. Similarly, if the legend show/hide control 246 is set to "Shown" as depicted in FIG. 2B, then the device 100 displays a legend 260 at a location that is configurable via the legend location pull-down menu 248 and with a border that is configurable via the legend border entry field 250. Finally, the device 100 sets the width of the columns of the waterfall chart 204 according to the value entered in the column width percentage field 252 and sets the waterfall chart 204 as either vertical or horizontal based on the state of the series data horizontal/vertical control 254.

Figure 2D:
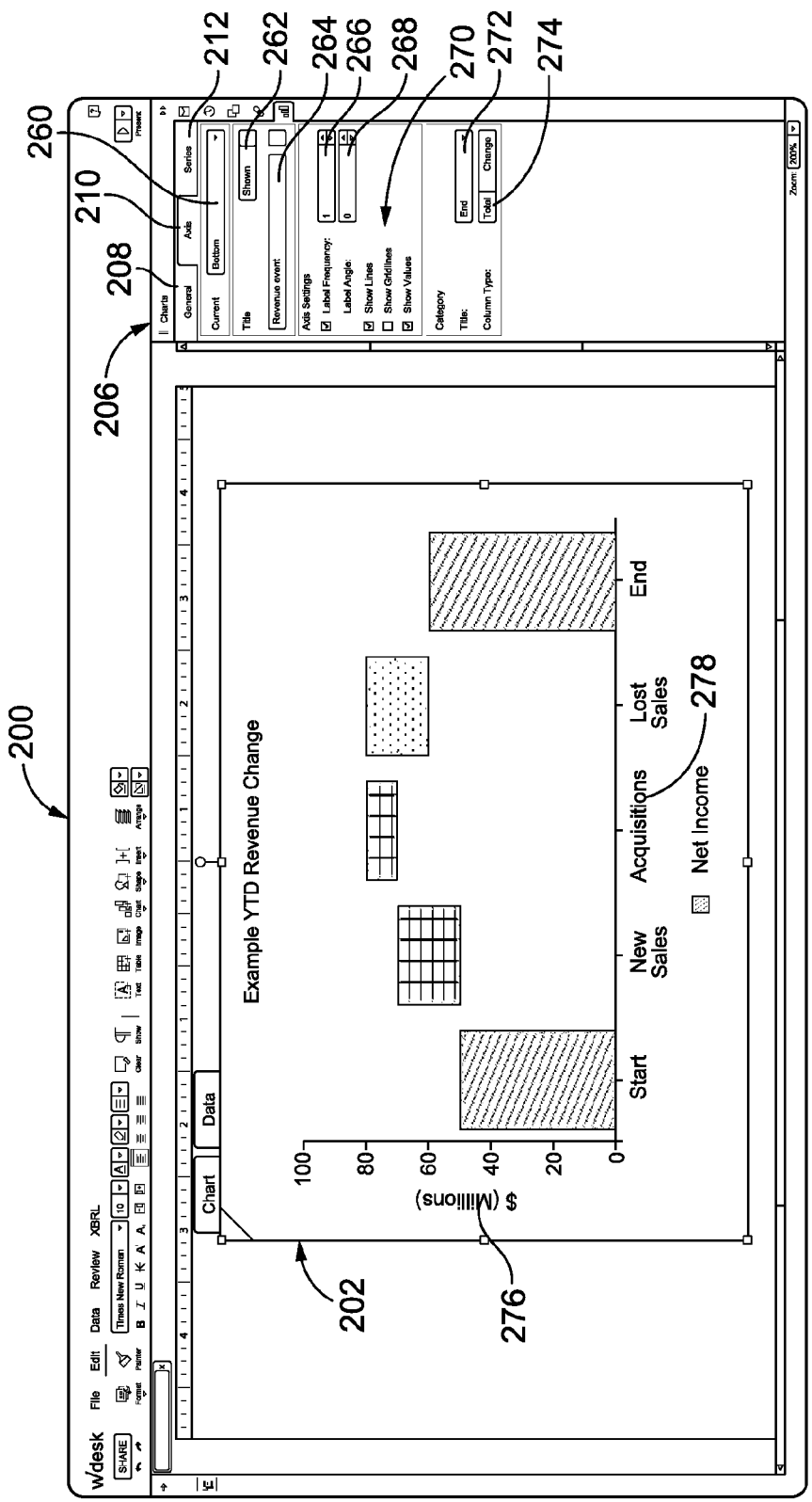

Turning to FIG. 2D, the second tab 210 includes an axis selection pull-down menu 260 (through which to select an axis (bottom or left) to be configured), an axis title show/hide control 262, an axis title entry field 264, a label frequency field 266, a label angle field 268, several checkbox controls 270, a column select pull-down menu 272, and a column type control 274. When the device 100 receives a selection of an axis from the pull-down menu 260, an entry of a title in the title entry field 264, and the show/hide control 262 is toggled to "Shown," the device 100 inserts and displays one or both of a vertical axis title 276 and a horizontal axis title 278. Furthermore, the device 100 sets the label frequency of the selected axis according to the entry in the label frequency field 266, sets the label angle according to the entry in the label angle field 268, and determines whether or not to show axis values, lines, and gridlines based on the state of the checkboxes 270. The column select pull-down menu 272 and column type control 274 will be described below in further detail.

Figure 2E:
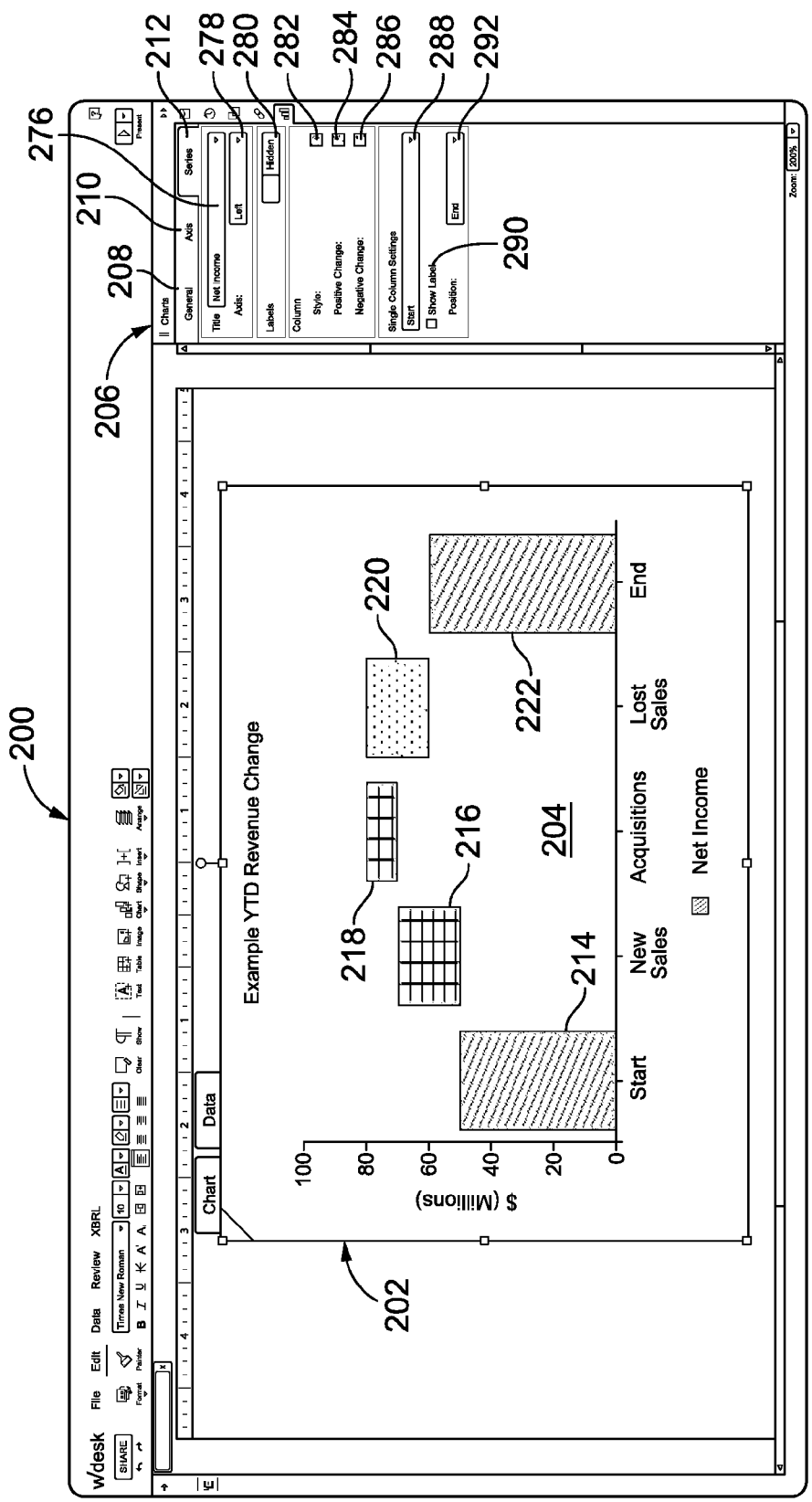

Turning to FIG. 2E, in an embodiment, the third tab 212 includes a title pull-down control 276, an axis pull-down control 278, a label show/hide control 280 and set of column color controls, including a first color control 282 for total columns, a second color control 284 for positive change columns, and a third color control 286 for negative change columns. The third tab 212 also includes a column select pull-down control 288, a show label checkbox control 290, and a position pull-down control 292. Using the title pull-down control 276, a user may select an axis of the waterfall chart 204. The user may then select a position for the selected axis using the axis pull-down control 288. In response to receiving these selections, the device 100 moves the selected axis to the selected location on the waterfall chart 204. The user may also use the column color controls 282, 284, and 286 to change the color of the corresponding columns. For example, assume that the first change column 216 and the second change column 218 are currently green. If the user manipulates the second color control 284 (which would initially be set to green) so as to select yellow (e.g., from a pop up color palette menu), then the device 100 reacts by automatically re-rendering the first change column 216 and the second change column 218 as yellow columns.

Figure 3:
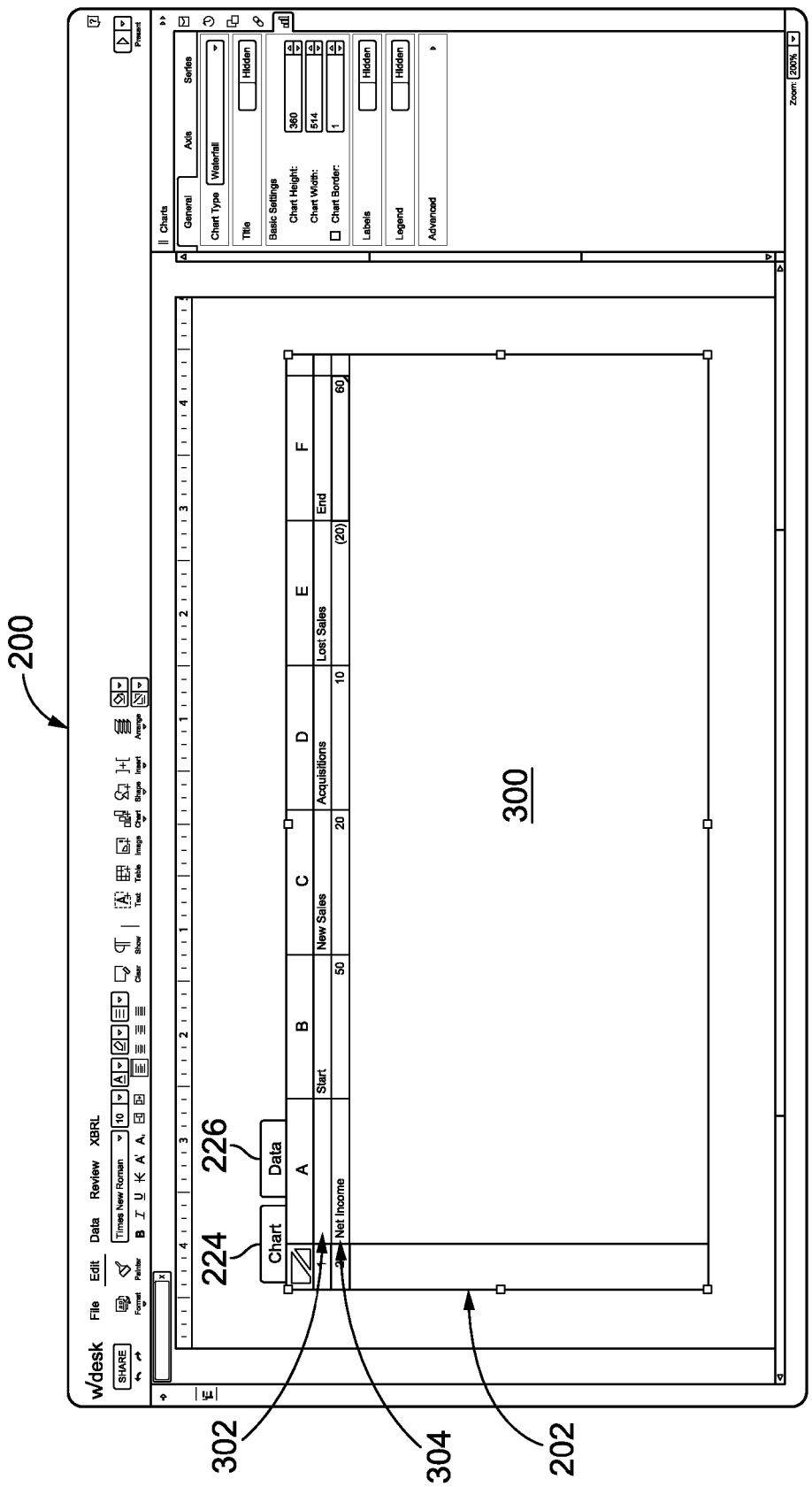
FIG. 3 shows how a table that provides the basis for a waterfall chart can be edited in various embodiments.

Turning to FIG. 3, in an embodiment, the device 100 creates the waterfall chart 204 (shown in previous paragraphs) from data contained in a table 300. The table 300 includes a first row 302 containing textual names of the columns of the waterfall chart 204. For example, cell B1 contains the name of the first total column 214, cell C1 contains the name of the first change column 216, cell D1 contains the name of the second change column 218, cell E1 contains the name of the third change column 220, and cell F1 contains the name of the second total column 222.

The table 300 also include a second row 304 containing the text of a legend label for the waterfall chart 204 as well as static values (e.g., integers or decimal values) or formulas (e.g., sums of previous cells) that the device 100 uses to determine the dimensions of the columns of the waterfall chart 204. For example, cell A2 contains the text used for the legend 230, cell B2 contains the static value of the first total column 214 (i.e., the initial value for the waterfall chart 204), cell C2 contains the static value of the first change column 216 (i.e., the amount of change from the previous column or "the change value"), cell D2 contains the static value of the second change column 218, cell E2 contains the static value of the third change column 220, and cell F2 contains a formula "=SUM(B2:E2)" that sums up the prior columns. The device 100 calculates the result of the formula in the cell F2 and uses the result to establish the vertical dimension of the second total column 222 (i.e., the final total column). All or some of the entries in the table 300 may be entered by a user or generated (e.g., as part of a template) by the application 106.

In an embodiment, when a new value is entered into one or more of the cells of the table 300 (e.g., by a user), the device 100 automatically updates the waterfall chart 204 in a corresponding manner. For example, the device renders the waterfall chart 204 so that it includes the initial value (from cell B2) as a total column, the change values from cells C2, D2, and E2 as change columns that float with respect to the zero of the vertical axis, and a final total column whose height is proportional to the sum of the initial value and the change values.

Figure 4:
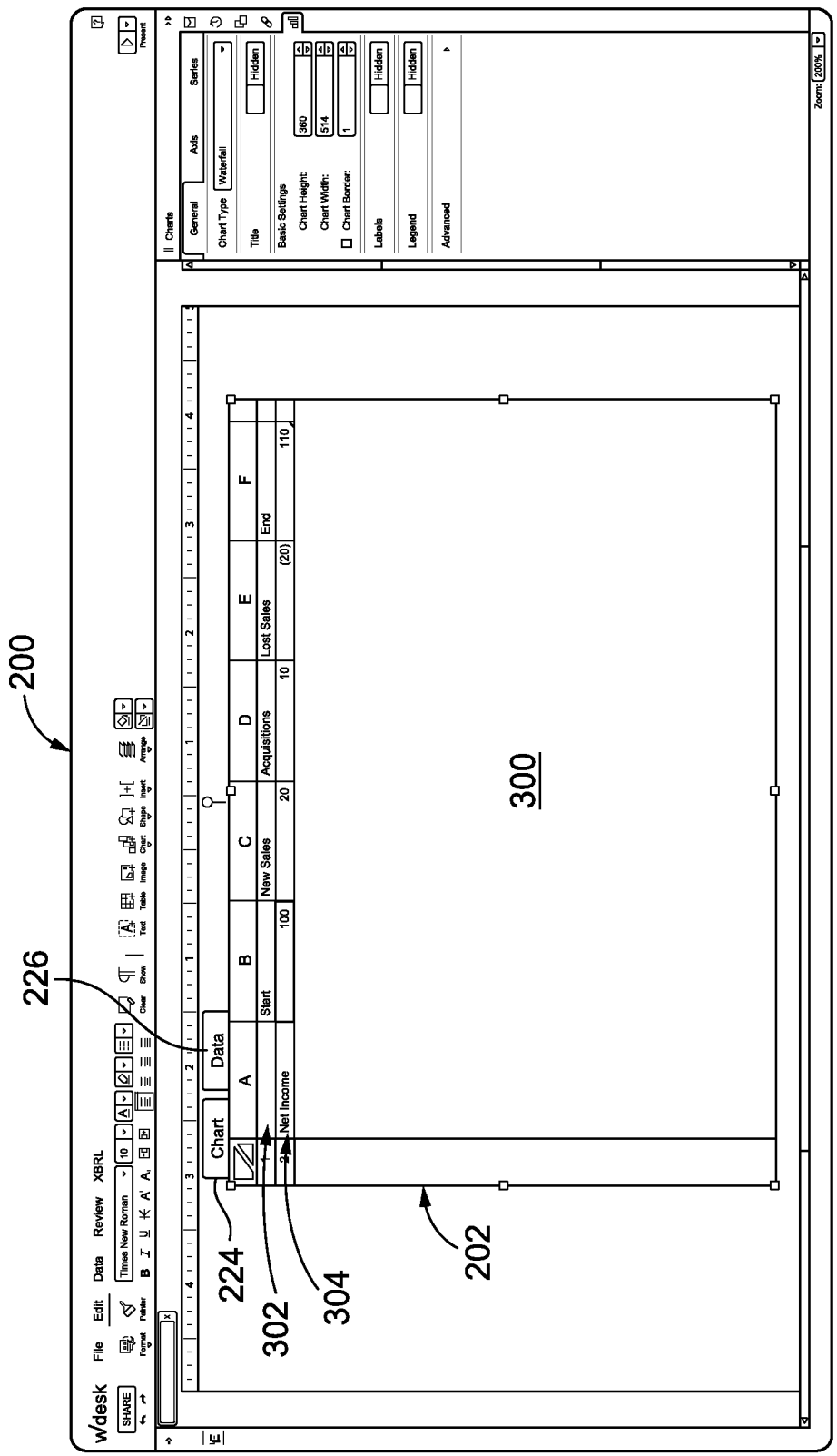
FIG. 4 shows changes that can be made to the table in an embodiment.
Figure 5:
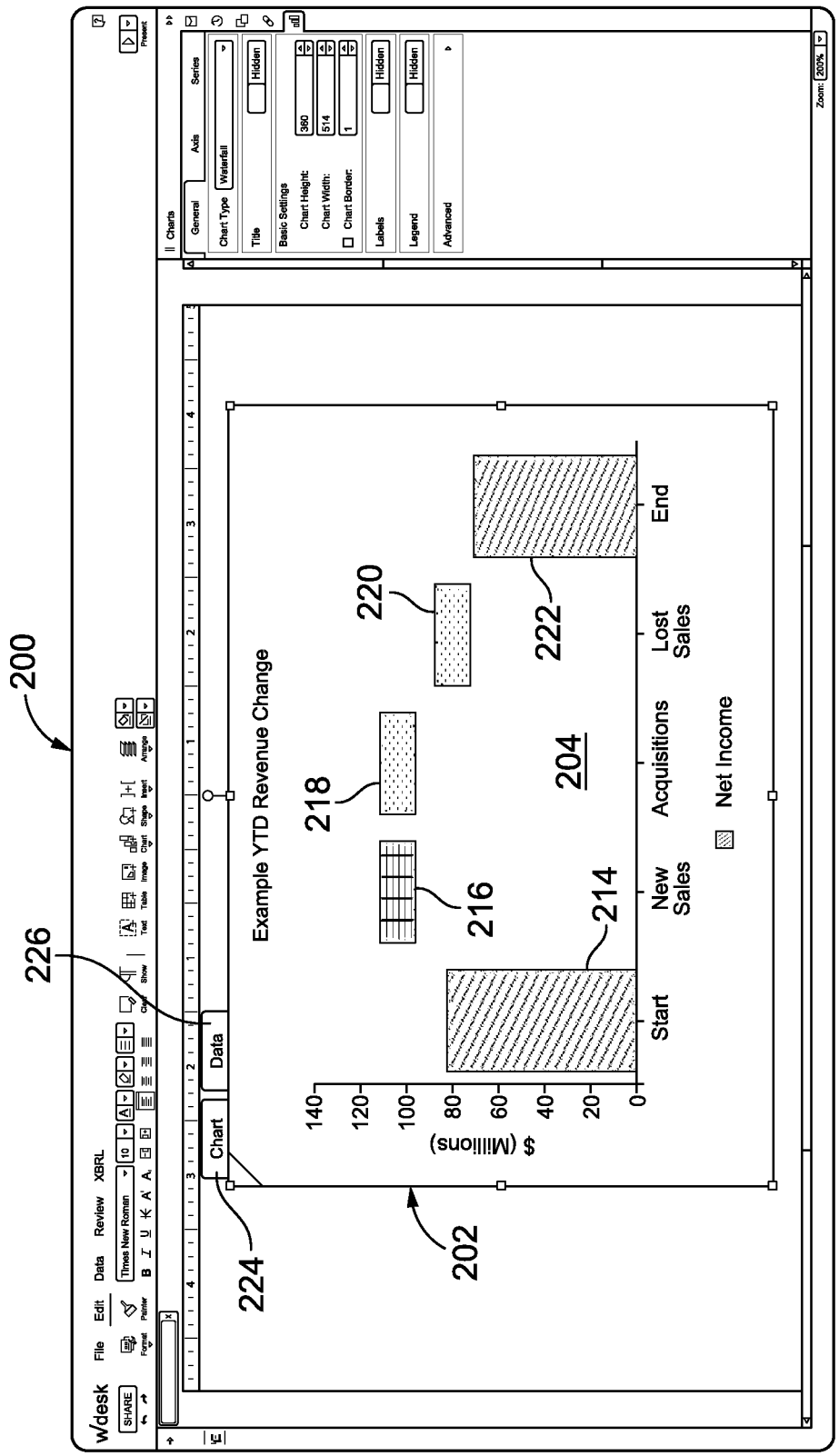
FIG. 5 shows how the computing device renders the resulting waterfall chart after changes are made to the underlying table.

Turning to FIG. 4, for example, when the user changes the value in cell B2 from 50 to 100, the device 100 changes (increases) the dimensions of the first total column 214. When the user changes the value in cell D2 from 10 to negative 20, the device 100 converts the third change column 220 from a positive change column into a negative change column, as shown in FIG. 5, by changing the dimensions, position, and color of the third change column 220. Furthermore, the device 100 updates the position of the first change column 216 and the second change column 218 in relationship to the change in the first total column 214. Also, since the result in cell F2 in the table 300 has changed from 60 to 110, the device 100 will change the vertical dimension of the second total column 222 accordingly.

In an embodiment, the device 100 renders columns on a waterfall chart as change columns or total columns based on whether the input into the corresponding cell of the table is a static value or a sum, and possibly whether the column is the first column of the waterfall chart, the last column of the waterfall chart, or an intermediate column. For example, if a user enters a static value into a cell, and the cell is not associated with the first or last column of the waterfall chart, then the device 100 assumes that the user wishes to create a change column. If a user enters a sum (i.e., a formula that sums one or more preceding cells), the device 100 assumes that the user wishes to create a total column. In some embodiments, the default behavior of the device 100 can be overridden by the user. For example, by interacting with the UI 200, the user could make one or both the first column and the last column a change column.

Figure 6:
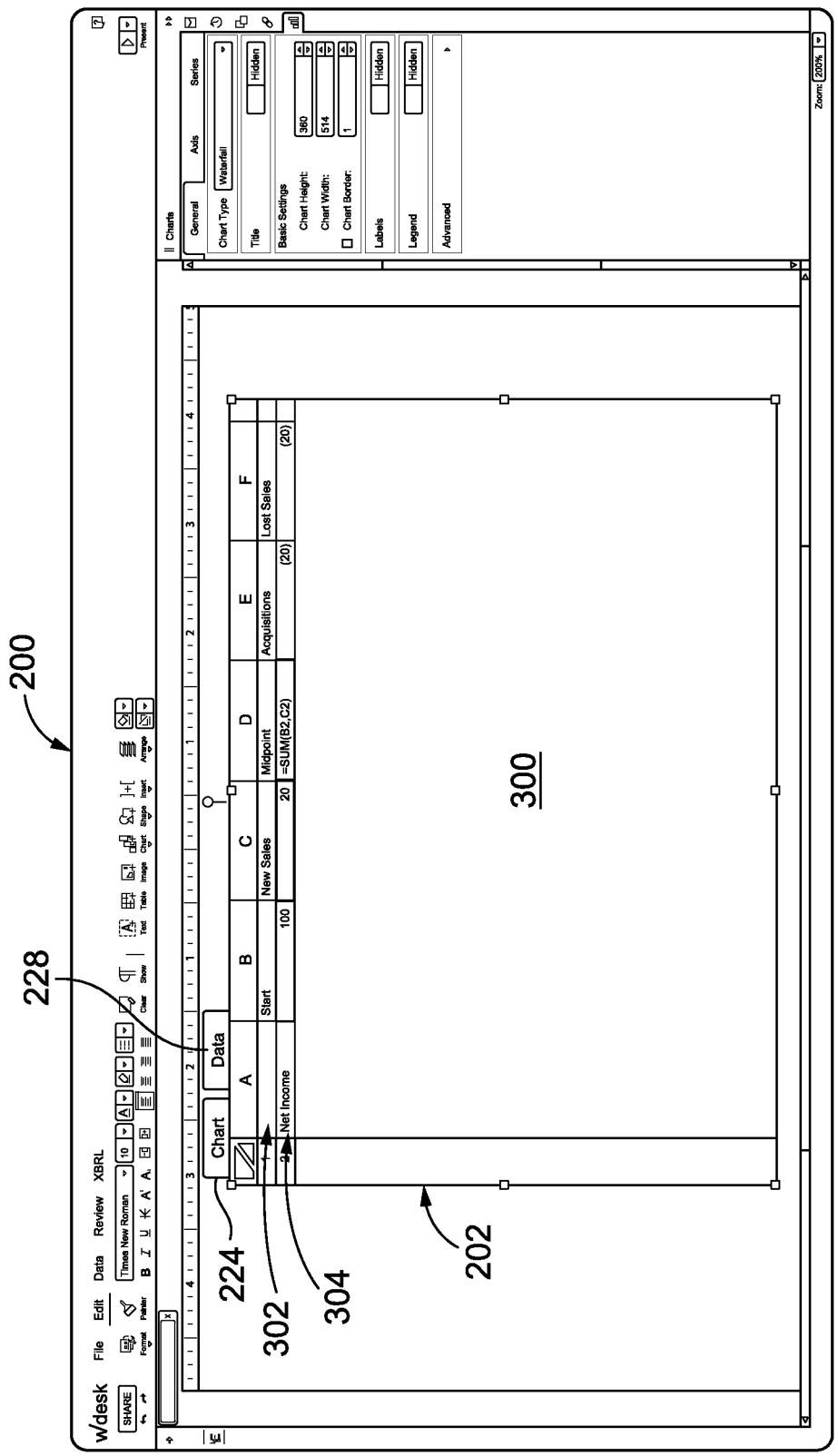
FIG. 6 shows how the computing device can use a summation formula to create a total column in an embodiment.
Figure 7A:
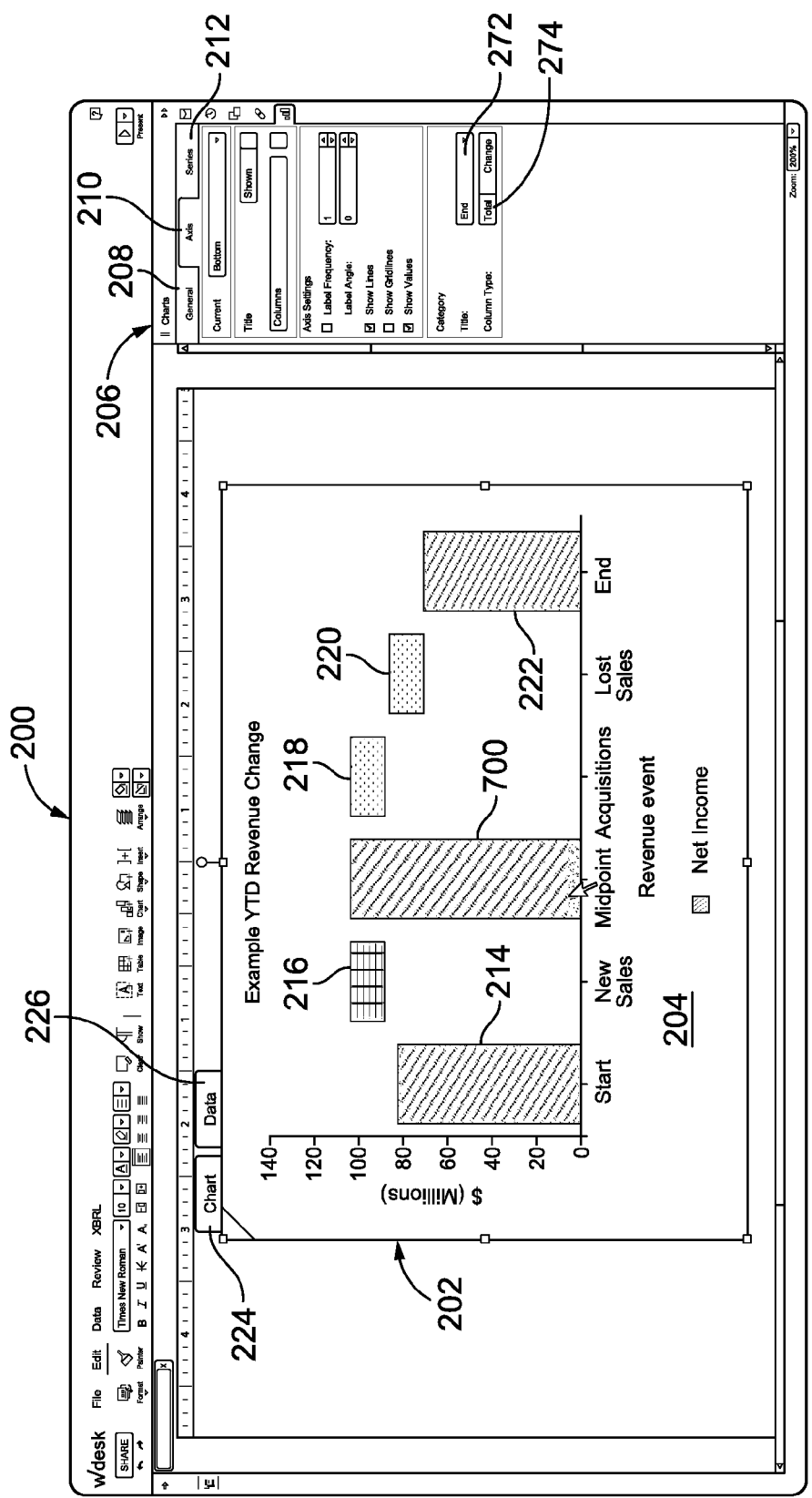
FIGS. 7A and 7B show how the computing device can convert a total column to a change column and vice versa in an embodiment.

Turning to FIG. 6, assume that the user right clicks on column D and selects, from a menu, the option to insert a column to the left. The device 100 reacts by shifting all of the columns from D through F to the right. The user then names the column "Midpoint" by entering "Midpoint" in cell D1 and enters the formula "=SUM(B2,C2)" in cell D2 as shown in FIG. 6. The device 100 reacts by rendering a third total column 700, which is shown in FIG. 7A. The device 100 also moves the second change column 218, the third change column 220, and the second total column 222 to the right. In some embodiments, the formula in cell G2 of the table 300 is automatically updated so as to exclude the third total column 700. For example, the device 100 may update the formula to "=SUM(B2, C2, E2, F2)." If, on the other hand, the user enters a static value in cell D2 (e.g., 120), then the device 100 reacts by rendering a fourth change column 702, shown in FIG. 7B, having the appropriate color (for a positive change column in this case) and the appropriate configuration (e.g., correct dimensions and floating).

Figure 7B:
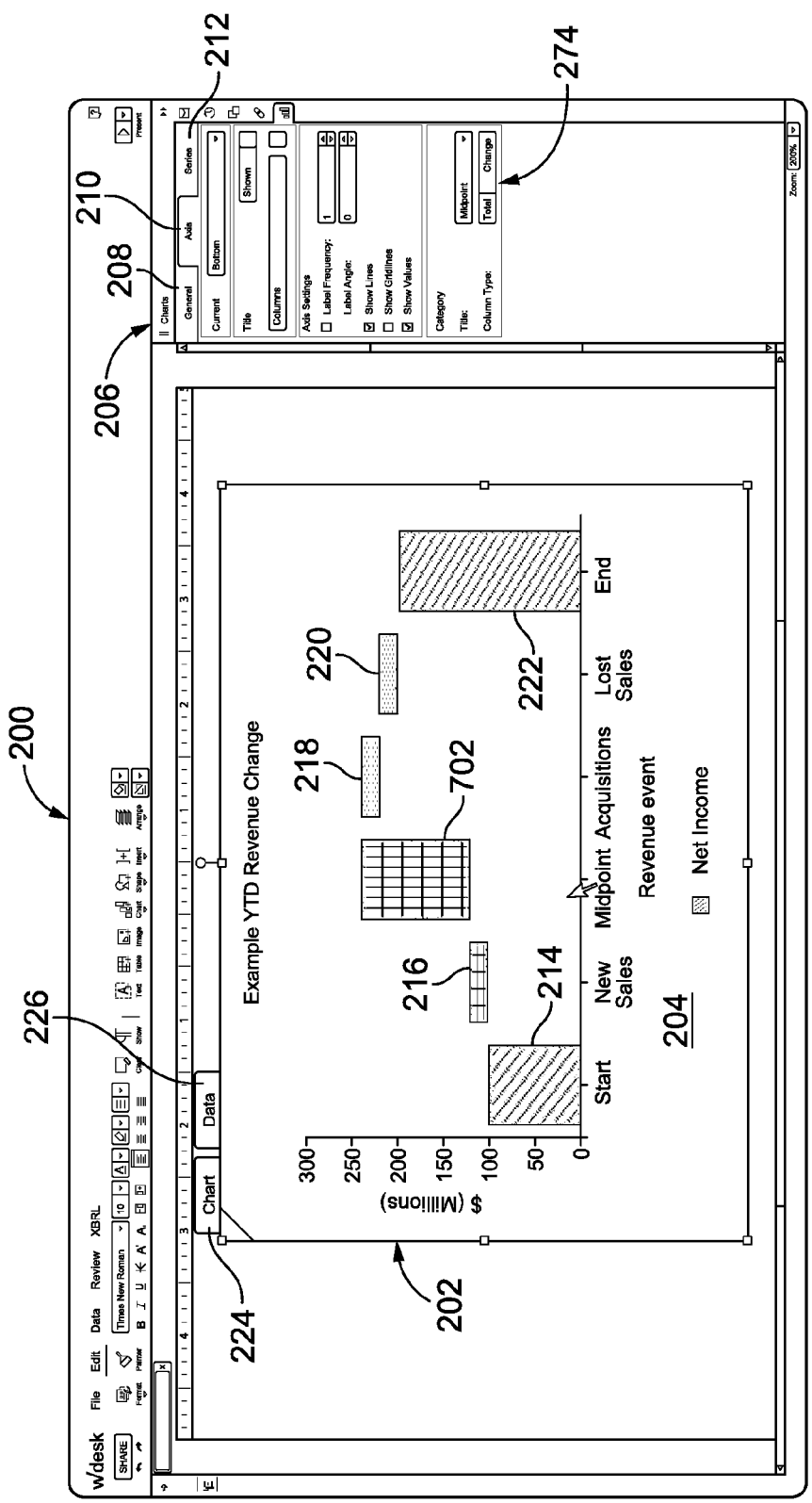

Referring still to FIG. 7A and FIG. 7B, in an embodiment, the device 100 receives (e.g., from a user) a selection of a particular column on the waterfall chart 204 via the column select pull-down menu 272. The device 100 also receives an input, via the column type control 274, indicating that the column should be switched from a total column to a change column or vice versa. In response, the device 100 switches the selected column from a change column to a total column or vice versa. For example, if the user selects the third total column 700 and toggles the column type control 274 from "total" to "change," then the device 100 reacts by replacing the third total column 700 with the fourth change column 702 (shown in FIG. 7B).

Figure 8:
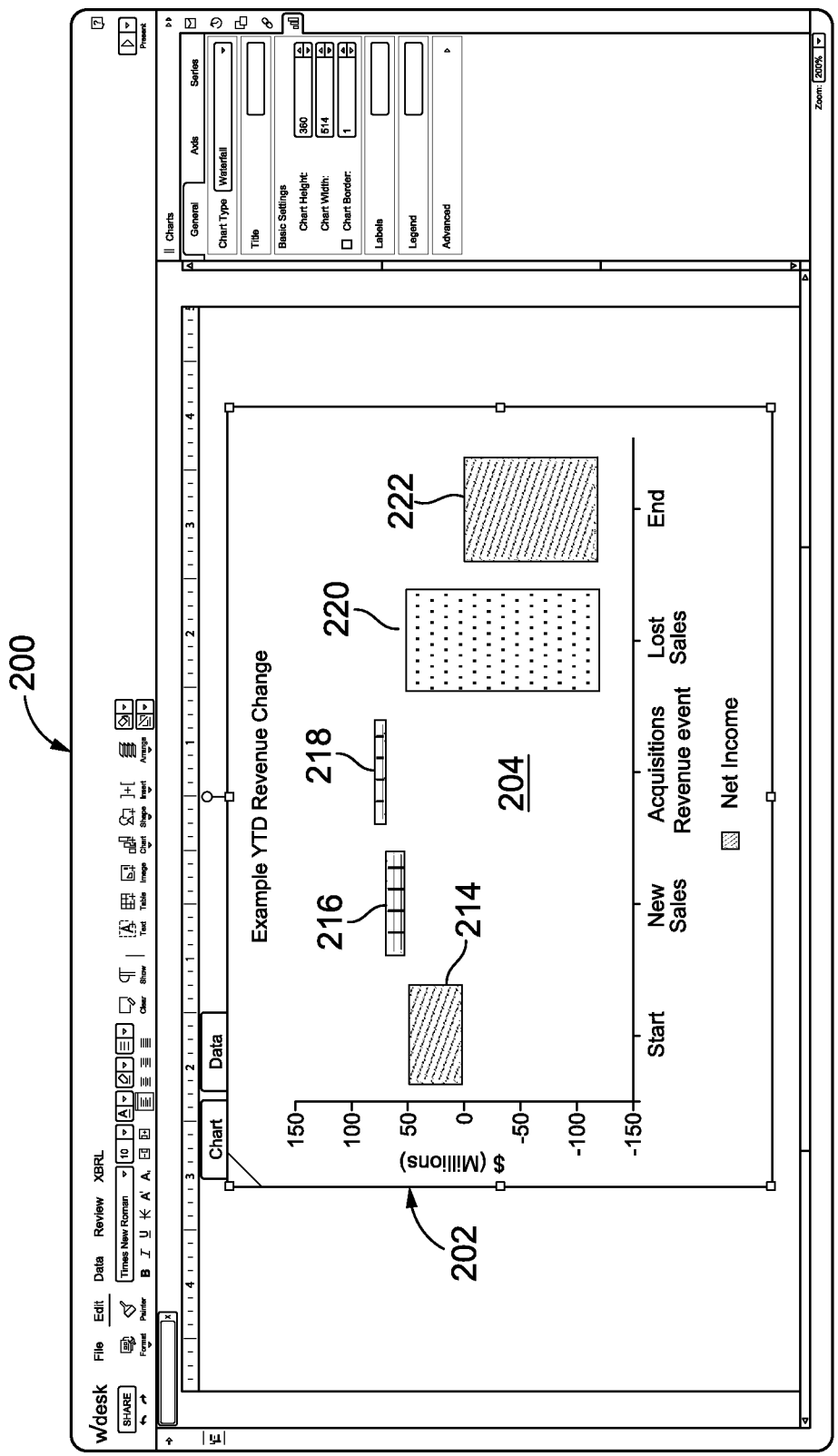
FIG. 8 shows how the computing device changes the scale of the vertical axis of a waterfall chart in an embodiment.

According to an embodiment, the device 100 adjusts the vertical axis of the waterfall chart based on changes in the values in the cells of the underlying table. For example, assume that the user changes the value in cell E2 in the table 300 (FIG. 3) from negative 20 to negative 200. The device 100 reacts by re-rendering the third change column 220 so that it is now a larger negative change column, and re-rendering the vertical axis so that it now accommodates the larger resulting negative value. The resulting change in the waterfall chart 204 is shown in FIG. 8.

Figure 9:
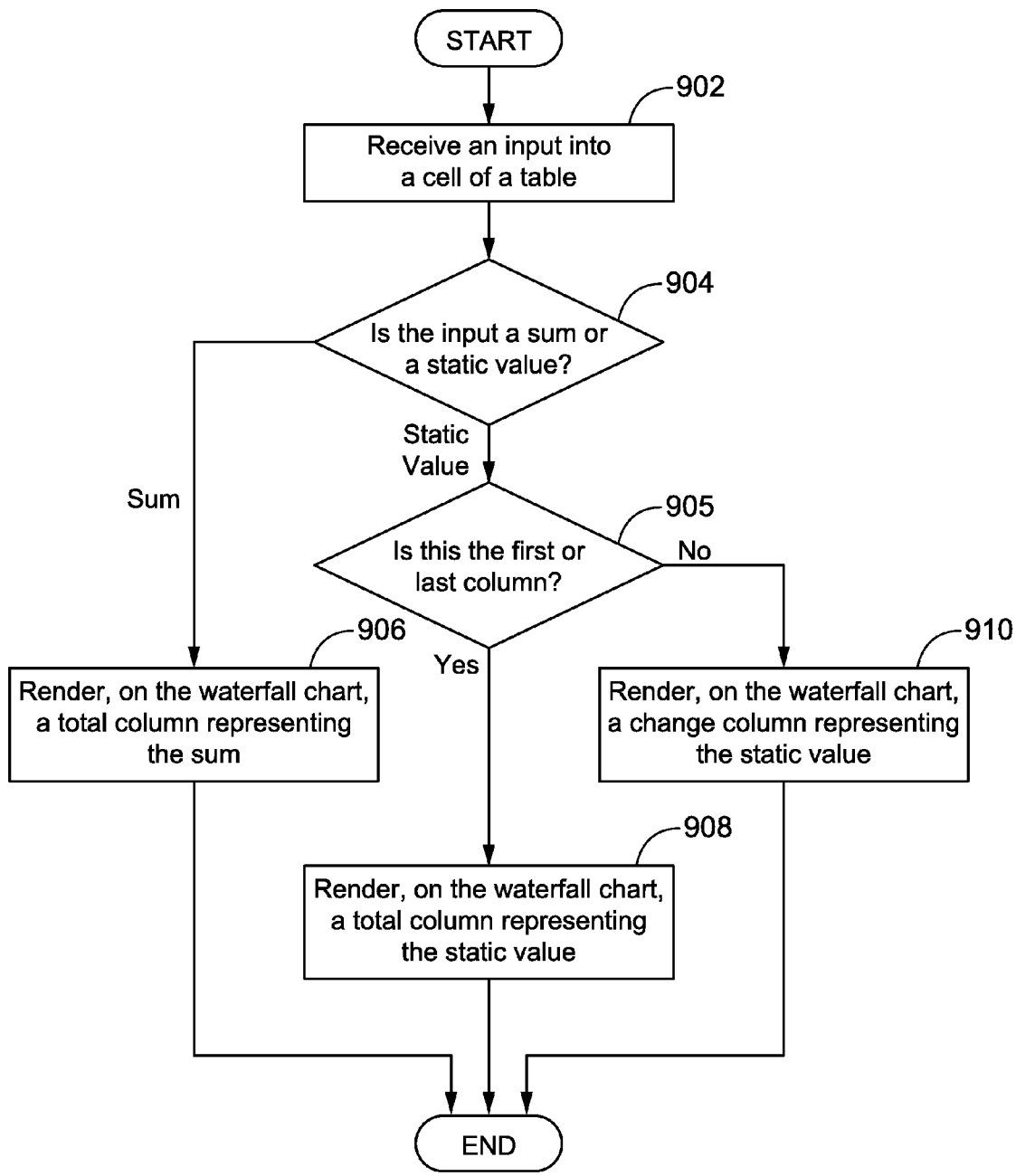
FIG. 9 and FIG. 10 show procedures carried out by the computing device in various embodiments.

Turning to FIG. 9, a procedure carried out by the device 100 (e.g., by the processor 102) in an embodiment is described. At block 902, the device 100 receives an input into a cell of a table. If, at block 904, the input is a sum, then the process continues to block 906, at which the device 100 renders, on the waterfall chart, a total column representing the sum. If, at block 904, the input is a static value, then process continues to block 905. If, at block 905, the column associated with the cell is the first column or the last column of the waterfall chart, then, at block 908, the device 100 renders a total column representing the static value on the waterfall chart. If, at block 905, the column associated with the cell is not the first column or the last block column, then the process continues to block 910, at which the device 100 renders, on the waterfall chart, a change column representing the static value.

Figure 10:
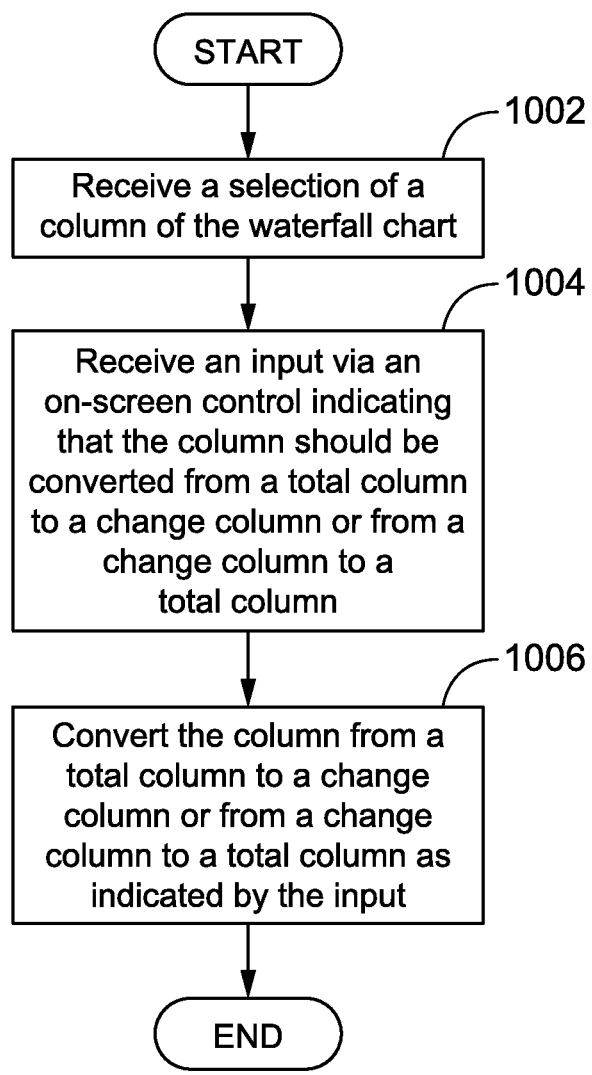

Turning to FIG. 10, a procedure carried out by the device 100 (e.g., by the processor 102) in another embodiment is described. At block 1002, the device 100 receives a selection of a column of the waterfall chart. At block 1004, the device 100 receives an input via an on-screen control indicating that the column should be converted from a total column to a change column or from a change column to a total column. At block 1006, the device 100 converts the column from a total column to a change column or from a change column to a total column as indicated by the input.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the flowcharts of FIGS. 9 and 10 can be reordered in ways that will be apparent to those of skill in the art.

What is claimed is:

1. On a computing device, a method for configuring a waterfall chart, the method comprising:
   receiving, from a user, an input of a sum into a cell of a table;
   interpreting the input of the sum as an indication that the user wishes to create a total column;
   automatically selecting a color for the total column based on the input being a sum;
   rendering, on the waterfall chart, the total column having the selected color;
   receiving, from a user, an input of a static value into a cell of a table;
   interpreting the input of the static value as an indication that the user wishes to create a change column;
   automatically selecting a color for the change column based on the input being a static value and based on whether the static value is positive or negative;
   rendering, on the waterfall chart, the change column having the selected color;
   receiving a selection of either the total column or the change column of the waterfall chart;
   receiving an input via an on-screen control, wherein the input indicates that the column should be converted from a total column to a change column or from a change column to a total column;
   converting the column from a total column to a change column or from a change column to a total column as indicated by the input; and
   automatically changing the color of the converted column to a that of a change column or that of a total column based on the indication of whether column should be converted from a total column to a change column or from a change column to a total column.

2. The method of claim 1, wherein:
   rendering the total column comprises rendering, in a first color, a column that represents the cumulative sum of values of preceding columns; and
   rendering the change column comprises rendering the change column in a second color if the static value is a positive value or in a third color if the static value is a negative value, wherein the rendered change column that indicates a degree of change from a preceding column.

3. The method of claim 1, further comprising:
   receiving the input via a user interface;
   presenting, on the user interface, a plurality of color options for positive change columns and a plurality of color options for negative change columns;
   receiving, via the user interface, one or both of:
      a selection of a color option of the plurality for positive change columns; and
      a selection of a color option of the plurality for positive change columns; and
   in response to the selection, changing the color of all positive change columns of the waterfall chart or all negative changes columns of the waterfall chart according to the selected color option.

4. The method of claim 1, further comprising:
   receiving a selection of a color option of total columns; and
   in response to the selection, changing the color of all total columns of the waterfall chart according to the selected color option.

* * * * *